United States Patent [19]

Kurosu et al.

[11] Patent Number: 4,467,454
[45] Date of Patent: Aug. 21, 1984

[54] HIGH-SPEED EXTERNAL MEMORY SYSTEM

[75] Inventors: Hirohiko Kurosu, Tokyo; Satoshi Nagata, Kodaira; Yasuo Satake, Kawasaki, all of Japan

[73] Assignee: Fujitsu Limited, Kawasaki, Japan

[21] Appl. No.: 334,927

[22] Filed: Dec. 28, 1981

[30] Foreign Application Priority Data

Dec. 29, 1980 [JP] Japan ................................ 55-187901

[51] Int. Cl.³ ............................................ G11C 7/00
[52] U.S. Cl. ..................................... 365/189; 365/230
[58] Field of Search ................................. 365/189, 230

[56] References Cited
FOREIGN PATENT DOCUMENTS 54-4028 1/1979 Japan .................................... 365/189

Primary Examiner—Joseph A. Popek
Attorney, Agent, or Firm—Staas & Halsey

[57] ABSTRACT

In an external memory system having a program mode for controlling a read/write operation of a memory of the external memory system by a central processing unit and having a direct memory access mode permitting a direct access to a main memory, there are provided first and second location address registers. The memory addressing is performed by the first location address register in the direct memory access mode and by the second location address register in the program mode, whereby it is possible to execute the read/write operation with the memory of the external memory system in the program mode during a burst timing interval during data transfer in the direct memory access mode, thus permitting high-efficiency data processing.

6 Claims, 6 Drawing Figures

HIGH-SPEED EXTERNAL MEMORY SYSTEM

BACKGROUND OF THE INVENTION

1. Field of the Invention

The present invention relates to a high-speed external memory system, and more particularly to a high-speed external memory system which permits the execution of a read/write operation in a program mode during data transfer from the external memory system to a central processing unit in a direct memory access mode.

2. Description of the Prior Art

A conventional type of external memory system which is controlled by a microprogram has an arrangement as illustrated in FIG. 2. A description will be given of its operation in the program mode and the direct memory access (hereinafter referred to as DMA) mode.

A description will be given first of starting the external memory system while in the program mode. When supplied with a selected address from the external memory system via a data bus e from a central processing unit (hereinafter referred to as the CPU) 1, an input and output address matching circuit (IOA math) 2 compares the address with an address of the external memory system inputted from an input and output address generator 3 and, in case of coincidence, provides a start signal to a sequence controller (SEQ CTL) 4. Then the sequence controller 4 applies a control signal to a microprogram control M which comprises a sequencer (SEQ) 5, a control memory (CM) 6 and a control memory instruction register (CMIR) 7. The sequencer 5 responds to the control signal from the sequence controller 4 to sequentially deliver control instructions from the control memory 6 to the control memory instruction register 7. The control memory instruction register 7 has the function of storing and executing the control instructions from the control memory 6. When starting the microprogram, the control memory instruction register 7 reports the acceptance of the access to the CPU 1 via an IOM (Input and Output Mode) control 8 and an IOM signal line d. CPU 1 recognizes the acceptance of the access and sends an order specifying the execution of a memory access by the external memory system via a CPM (Central Processor Mode) signal line c to the sequence controller 4 system. Then the sequence controller 4 restarts the sequencer 5. When this order is determined by the microprogram control M to be normal, the decision result is issued from the control memory instruction register 7 via the IOM control 8 to the CPU 1 to acknowledge the acceptance of the order, and the microprogram control M starts an operation following the order of the CPU 1. If this order is, for example, a one word readout order, address information is sent by the microprogram control M from the data bus e to the location address register (LAR) and the microprogram control M thereby provides the address information to a memory 10. Data read out from the memory 10 based on the address information is provided to a data buffer register (DBR) 11. The data thus loaded in the data buffer register 11 is checked by an error correcting circuit (ECC) 12 and is loaded again in the data buffer register 11. The microprogram control M applies a data transfer instruction via the IOM control 8 to the CPU 1 and instructs the data buffer register 11 to send out the data therefrom to the CPU 1 via the data bus e. The CPU 1 provides the information indicating that it has received the data via the CPM signal line c to the sequence controller 4. Upon reception of this signal by the microprogram control M, the one word readout operation in the program mode comes to an end. In the case where the external memory system receives a DMA order during the execution of the program mode, access the program mode access is stopped and acknowledged by applying acknowledgement for information the reception of the order to the CPU 1 via the CPM signal line c and thereafter the external memory system independently executes an access operation following the DMA order.

Next, in the event that the order given to the external memory system is an order for DMA transfer, a request to transfer is sent from the microprogram control M to the CPU 1 via the IOM control 8 and an RQ (Request) signal line b. When the CPU 1 is ready to receive the request, a request-OK signal is sent back to the external memory via an RQ-OK (Request-OK) signal line a, starting the DMA transfer. In this case, the data transfer from the memory 10 is performed in the same manner as in the program mode. If the quantity of data to be transferred is large, the CPU 1 is occupied by this transfer and results in the CPU processing being stopped for a long period of time. To avoid this, the large quantities data are transferred by steps of several units of data under the control of the microprogram control M and a burst timer 13 is activated after each transfer to provide burst timing control of the microprogram itself, and stops the transfer operation until started by the burst timer 13. During this timing interval, the CPU 1 may execute other processing. Upon completion of the burst timing, the microprogram control M is started by the burst timer 13 to again send the request for the DMA transfer to the CPU 1, and the external memory system resumes the DMA transfer under the control of the microprogram. This operation would be repeated until the predetermined quantity of data are all transferred.

FIG. 3 is a diagram illustrating the data transfer in the conventional external memory system shown in FIG. 2. When performing the DMA transfer, the operation is started by an instruction from the CPU 1 to effect the DMA transfer in accordance with an address loaded in the location address register 9. FIG. 3 illustrates the case where the DMA transfer is accomplished in steps of four words and the burst timing is provided in the interval between the respective DMA transfer operations. During the DMA transfer including the burst timing, the location address register 9 remains busy and even if a request for the program mode transfer occurs, the external memory system cannot accept the request. Upon completion of the DMA transfer of a required quantity of data, a DMA transfer end report is provided to the CPU 1, by which the location address register 9 is released from its busy state, making the external memory system ready for receiving an address in the program mode. When it is necessary to execute the program mode access, an address specified by the program mode is loaded in the location address register 9 and the program mode transfer is accomplished using the specified address.

As described above, according to the prior art, the read/write operation of the external memory in the program mode which occurs during the DMA transfer cannot be performed until after the DMA transfer is completed. In other words, the conventional external memory system is incapable of conducting the read/write operation in the program mode during the operation in the DMA mode, and hence it has a defect in that the processing time is delayed.

SUMMARY OF THE INVENTION

It is therefore an object of the present invention to provide a high-speed external memory system which is designed so that it can be restarted by the CPU in the program mode during the burst timing interval of the DMA processing and so that its memory is addressed by location address registers for both the DMA mode and the program mode, respectively, whereby data can be read out from or written in the memory of the external memory system in the program mode during the burst timing interval while in the DMA data transfer mode, permitting high-efficiency processing by the external memory system.

Briefly stated, the external memory system of the present invention, which operates under microprogram control, is provided first and second location address registers and, its memory is addressed by the first location address memory while in the DMA mode and by the second location address memory while in the program mode so that the read/write operation of the memory in the program mode can be executed during the burst timing interval while in the DMA data transfer mode.

DESCRIPTION OF THE PREFERRED EMBODIMENTS

Figure 1:
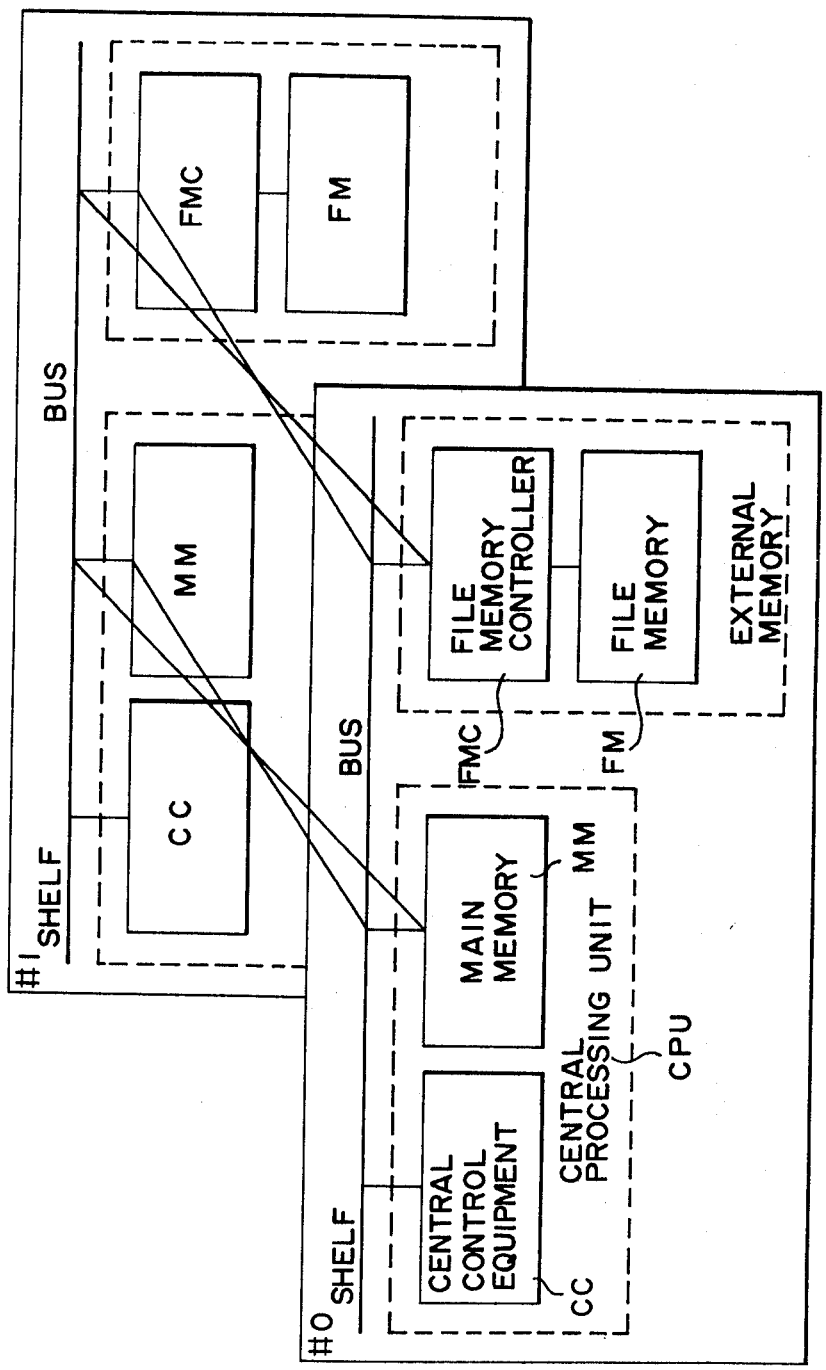
FIG. 1 is a diagram illustrating the arrangement of a system to which the present invention is applied.

FIG. 1 shows an example of a system arrangement to which the present invention is applied. In FIG. 1, each CPU comprises central control equipment CC and a main memory MM, which are interconnected via a bus and connected via the bus to an external memory system. The external memory system comprises a file memory FM and a file memory controller FMC. The present invention is directed mainly to the arrangement of the file memory controller FMC. In FIG. 1, the main memories and the external memory systems are respectively interconnected via buses, constituting a duplex system.

Figure 2:
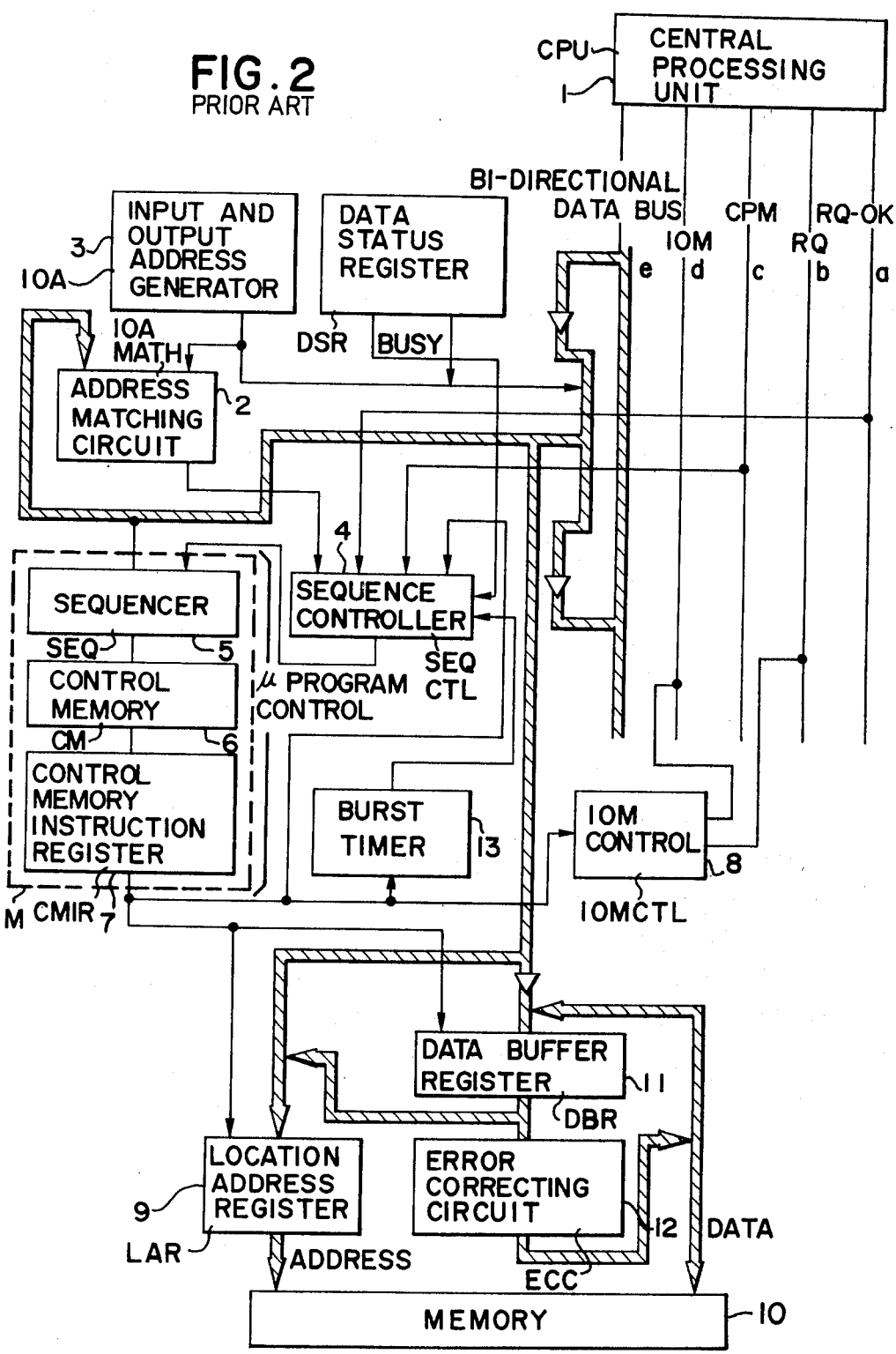
FIG. 2 is a block diagram illustrating an example of a conventional high-speed external memory system.
Figure 3:
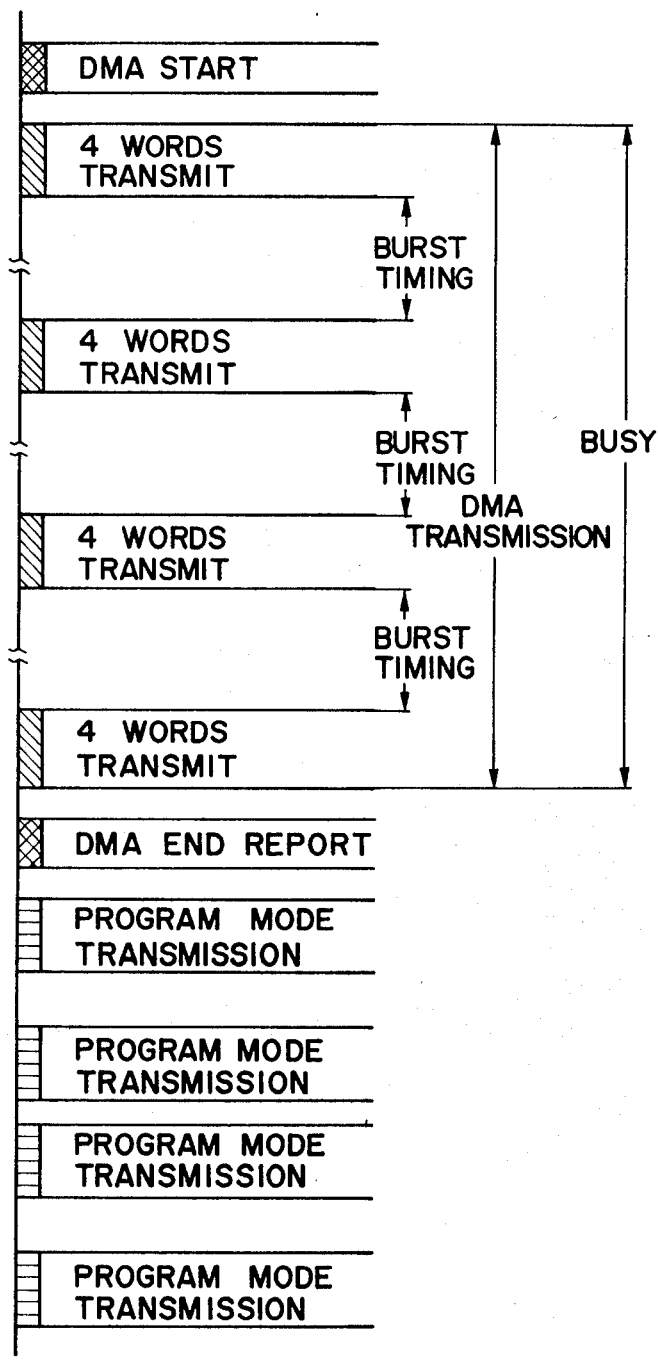
FIG. 3 is a diagram illustrating data transfer in the DMA and the program mode in the conventional external memory system of FIG. 2.
Figure 4:
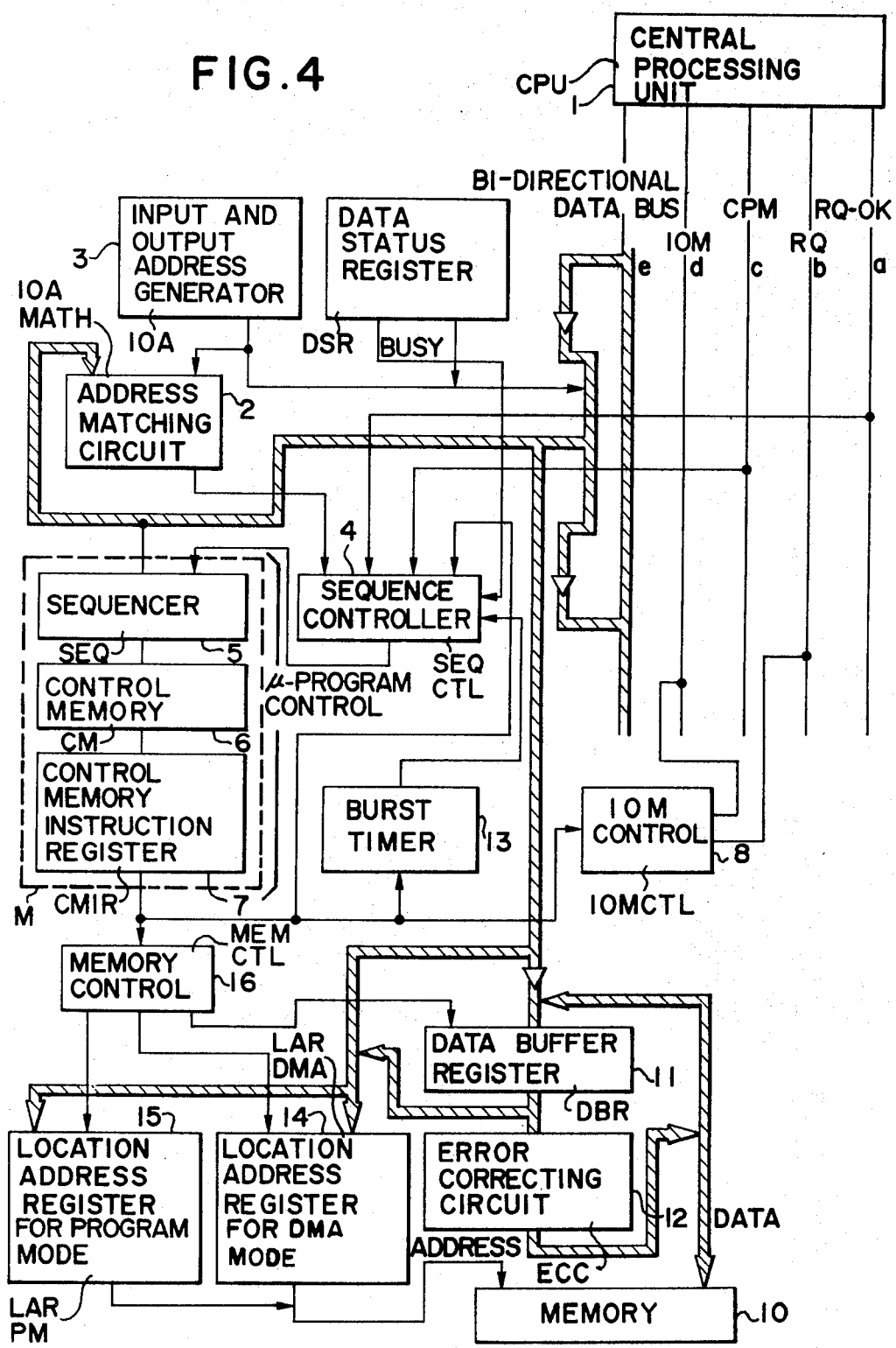
FIG. 4 is a block diagram illustrating the arrangement of an embodiment of the external memory system of the present invention.

Now, a description will be given, with reference to FIG. 4, of an embodiment of the present invention. This embodiment differs from the prior art example illustrated in FIG. 2 in that a location address register for DMA mode (LAR DMA) 14 and a location address register for program mode (LAR P-M) 15 are provided instead of the location register 9 (FIG. 2), and in that they are placed under the control of the microprogram control M. The microprogram control M provides control signals via a memory control (MEM CTL) 16 to the location address registers 14 and 15 and the data buffer register 11. During data transfer in the DMA mode, the microprogram control M applies the control signals to the location address register 14, which designates an address in the memory 10. The memory 10 sends out data from the designated address to the data buffer register 11. The data buffer register 11 responds to the control signals from the microprogram control M to apply the data to the output data bus e except during the burst timing as previously described. On the other hand, when the CPU 1 requests that the external memory system operating in the DMA mode be restarted in the program mode, an output signal from the input and output address matching circuit 2 is rejected in the aforementioned prior art example, but the present invention allows the acceptance of the request. That is, while the data transfer from the external memory system to the CPU 1 is suspended during the burst timing interval, the microprogram control M checks the request from the CPU 1. Having recognized that the request is one for restart in the program mode, the sequence controller 4 accepts it and supplies the microprogram control M with a command for operation in the program mode. Upon reception of the command, the microprogram control M provides the control signal via the memory control 16 to the location address register for the program mode 15. For example, in the case of writing data into the memory 10 in the program mode, the location address register 15 loads address information for the memory 10 and the data is written in the memory 10 via the data buffer register 11 and the error correcting circuit 12, thus completing the write operation in the program mode while in the DMA mode of operation. Then the external memory system waits for restart by the CPU 1 and the start by the burst timer 13. Upon starting by the burst timer 13 at the end of the burst timing interval, the microprogram control M checks a DMA status signal from a data status register (DSR) and, when the signal is busy, the DMA starting sequence is restored. In this way, this embodiment permits the execution of the program mode access operation during the burst timing even while in the DMA processing mode.

Figure 5:
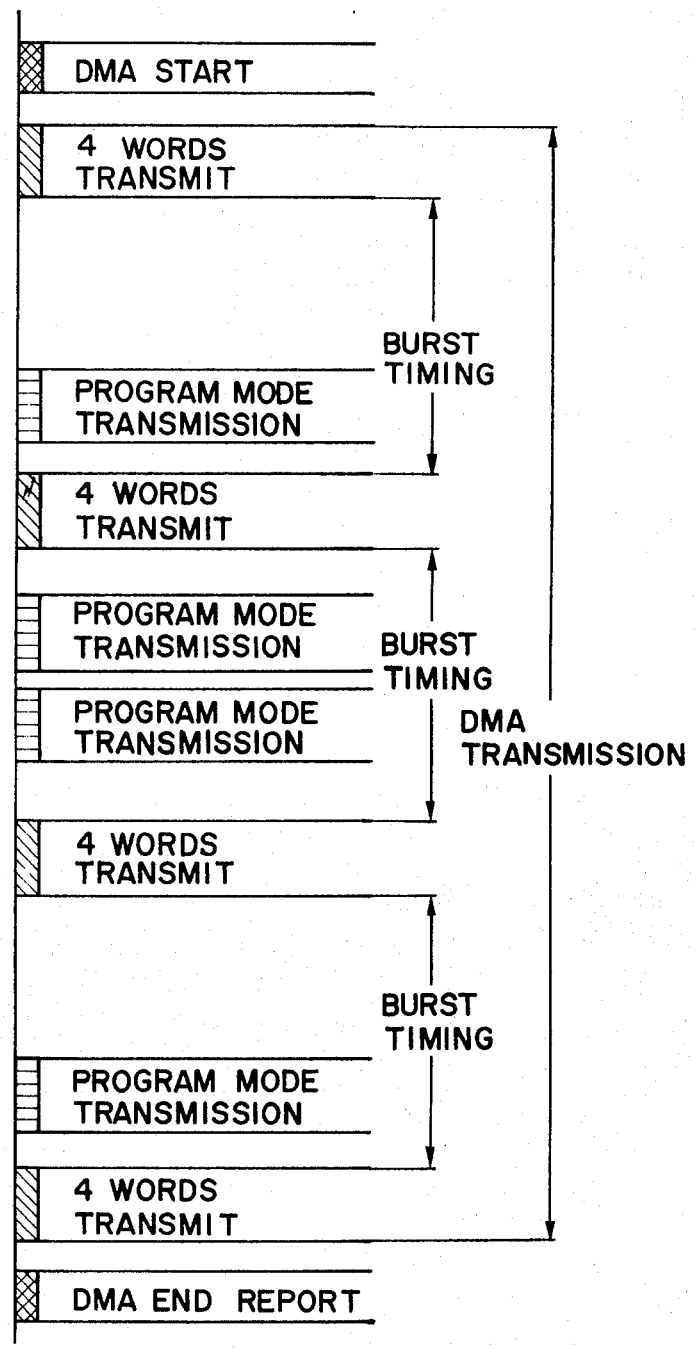
FIG. 5 is a diagram illustrating data transfer in the DMA and the program mode in the high-speed external memory system of the present invention as shown in FIG. 4.

FIG. 5 is a diagram illustrating the data transfer in the external memory system of the present invention. The DMA mode is started by a command from the CPU 1 and the DMA transfer is performed in accordance with an address loaded in the location address register for DMA mode 14. Also in the example illustrated in FIG. 5, the DMA transfer is accomplished by steps of four words and the burst timing is provided in the interval between the respective transfer operations. In the event that the CPU 1 requests the start of the program mode during the DMA operation, the data transfer in the program mode is performed in accordance with an address loaded in the location address register for program mode 15 during the first timing interval. At the end of the program mode, the DMA status signal is checked and, if it is busy, the DMA operation is resumed. Upon completion of the DMA transfer of a required quantity of data, a DMA end report is sent to the CPU 1.

Figure 6:
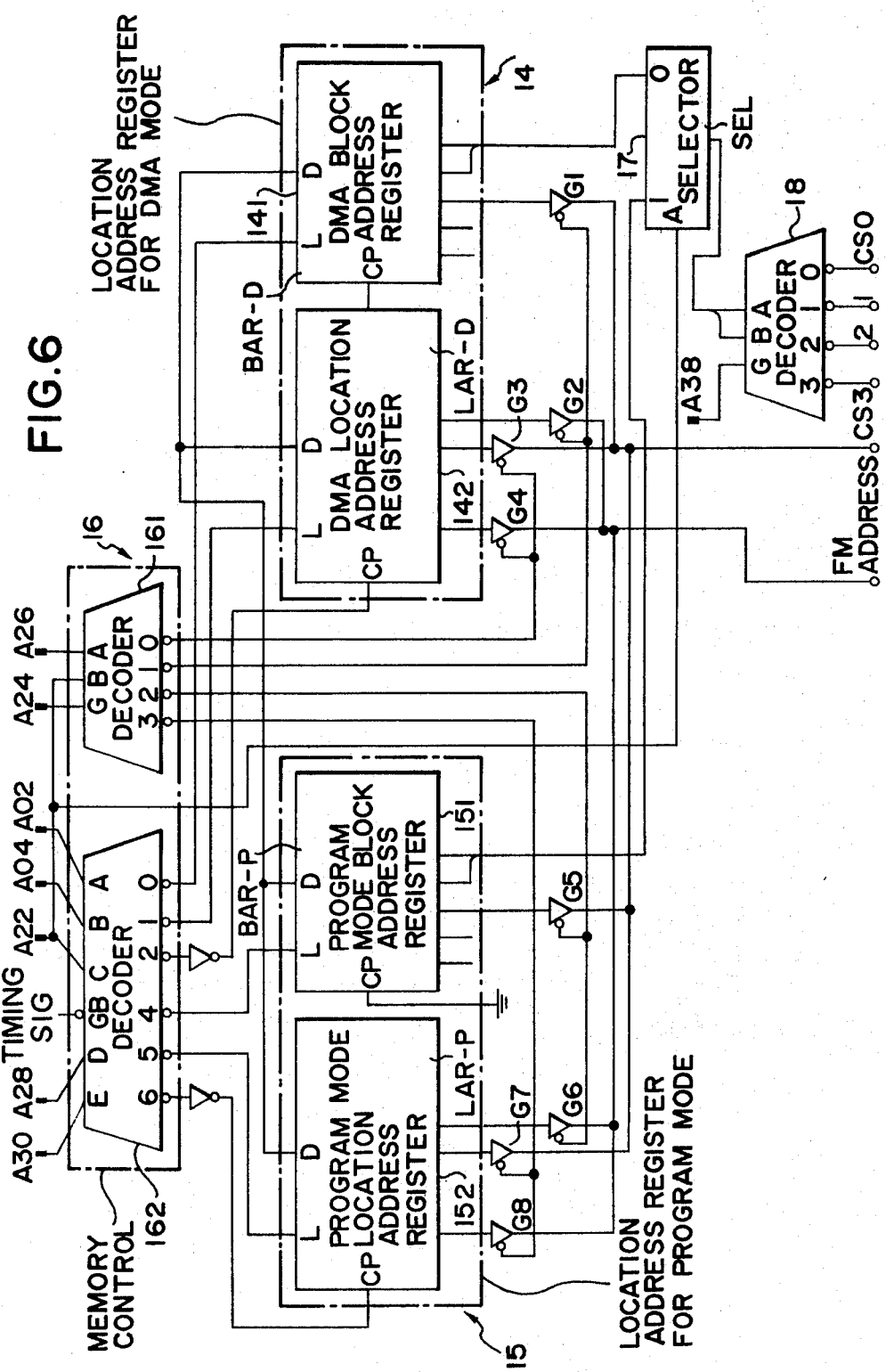
FIG. 6 is a diagram illustrating, by way of example, specific arrangements of a location address register for the DMA mode, a location address register for the program mode and a memory control.

FIG. 6 illustrates, by way of example, specific arrangements of the location address registers for DMA mode and program mode 14 and 15 and the memory control 16. The memory control 16 is composed of decoders 161 and 162 and responds to signals (A02 to A30) from the microprogram control M to selectively activate the location address register 14 or 15.

When in the DMA mode, the location address register 14 is selected. The location address register 14 comprises a DMA block address register (BAR-D) 141 and a DMA location address register (LAR-D) 142. The DMA block address register 141 stores and outputs a block address to the memory 10 and the DMA location address register 142 stores and outputs a location address to the memory 10. An initial value of an address and data on the number of words to be transferred, are applied via a data bus from the CPU 1 to a D terminal of both the DMA block address register 141 and the DMA location address register 142, and a load signal is provided to an L terminal of each register from the decoder 162, whereby the block and the location address are stored in the registers 141 and 142, respectively. When necessary to provide an address to the file memory for the DMA transfer gates $G_1$ and $G_2$ are opened first, through which the block address and high-order bits of the location address are sent out from the registers 141 and 142, respectively, and then gates $G_3$ and $G_4$ are opened to send out therethrough low-order bits of the location address from the register 142. Thus, the address is outputted in two stages on a time shared basis. Upon each transfer of one word, an increment signal is applied from the decoder 162 to a CP terminal of the DMA location address register 142 to add "1" to its address. When the address of the register 142 is carried, the carry signal is provided as an increment signal to a CP terminal of the DMA block address register 141 to add "1" to its address. In this way, by one address transfer from the CPU 1, addresses are sequentially outputted corresponding to data of a specified number of words starting with the initial value of the address. A portion of the output from the DMA block address register 141 is applied via a selector 17 to a decoder 18, wherein it is decoded into a chip select signal, which is provided to the file memory for the chip selection therein.

When in the program mode, the location address register for the program mode 15 is selected. The location address register 15 comprises a program mode block address register (BAR-P) 151 and a program mode location address register (LAR-P) 152. The program mode block address register 151 stores and outputs a block address to the memory 10 and the program mode location address register 152 stores and outputs a location address to the memory 10. When there is the data transfer in the program mode, addressing by the CPU 1 is performed for each word and address data is applied via a data bus to a D terminal of each of the registers 151 and 152, wherein it is stored by a load signal which is provided to an L terminal of each register. When it is necessary to provide an address to the file memory, gates $G_5$ and $G_6$ are opened first to provide therethrough the block address and high-order bits of the location address from the registers 151 and 152, respectively, and then gates $G_7$ and $G_8$ are opened to send out therethrough low-order bits of the location address from the register 152. In this way, the address is provided in two stages. An increment signal is applied to a CP terminal of the register 152 to add "1" to its address at the time of the second outputting. As is the case with the DMA location address register 14, the chip selection of the file memroy is accomplished by a portion of the high-order bits of the block address from the program mode block address register 151.

It will be apparent that many modifications and variations may be effected without departing from the scope of the novel concepts of this invention.

What is claimed is:

1. A high-speed external memory system having a microprogram control connected to a central processing unit which includes a main memory, said external memory system having a program mode for controlling a read/write operation of an external memory of the external memory system by said central processing unit and a direct memory access mode permitting a direct access to said main memory by said external memory, said external memory system comprising:

timing means, operatively connected to said microprogram control, for producing a burst timing interval during the direct memory access mode;

a first location address register, operatively connected to said microprogram control, said central processing unit and said external memory, for storing direct memory access address information for accessing said external memory of the external memory system by the central processing unit in the direct memory access mode outside the burst timing interval;

a second location address register, operatively connected to said microprogram control, said central processing unit and said external memory, for storing program access address information for accessing said external memory of the external memory system by the central processing unit in the program mode during the burst timing interval, whereby the read/write operation of the external memory of the external memory system can be executed by said central processing unit in the program mode during the execution of a direct memory access in the burst timing interval.

2. A high-speed external memory system according to claim 1, wherein at least one of the first location address register and the second location address register comprises:

a block address register, operatively connected to said microprogram control, said central processing unit and said external memory, for storing a block address; and a first register, operatively connected to said microprogram control, said central processing unit and said external memory, for storing a location address having high and low order bits, and said external memory system further comprising:

first and second gate means, operatively connected to said block address register, said first register and said external memory, for providing said block address and the high-order bits of said location address to said external memory; and third and fourth gate means, operatively connected to said first register and said external memory, for providing the low-order bits of the first register to said external memory, thereby to performing the memory addressing on a time shared basis.

3. A high-speed external memory system according to claim 1 or 2, further comprising a memory controller, operatively connected to said timing means, said microprogram control, said first location address register and said second location address register, for switching between the selection of the first location address register in the direct memory access mode and the selection of the second location address register in the program mode, said memory controller comprising decoders operatively connected to said timing means, said microprogram control, and said first and second location address registers.

4. A high-speed external memory system according to claim 1 or 2, further comprising decoder means, operatively connected to said timing means, said microprogram control and said first and second location address registers, for selecting one of said location address registers in dependence upon the mode.

5. A high-speed external memory system, operatively connected to a central processing unit and an external memory, for performing a combined memory access comprising a program mode memory access performed during a direct memory access mode memory access, comprising:

means, operatively connected to the central processing unit and the external memory, for receiving and supplying, from the central processing unit, a first address of an external memory starting location of a direct memory access and a second address of an external memory location of a program access, for generating memory access control signals in dependence upon a burst timing interval generated during the direct memory access mode and the receipt of the first and second addresses and for passing data, designated by the first and second addresses, between the central processing unit and the external memory;

a memory controller, operatively connected to said means for supplying, for generating first and second access signals in dependence upon the decoding of the control signals during the combined memory access, the second access signal being generated during the burst timing interval;

a first location address register, operatively connected to said memory controller, said means for supplying and the external memory, for receiving the first address of the direct memory access and for applying the first address to the external memory to perform a data transfer in the direct memory access mode in dependence upon the first access signal; and a second location address register, operatively connected to said memory controller, said means for supplying and the external memory, for receiving the second address of the program access and for applying the second address to the external memory to perform a data transfer in the program mode in dependence upon the second access signal, where a program access occurs during the burst timing interval.

6. A high-speed external memory system according to claim 5, wherein said memory controller comprises a decoder.

* * * * *

UNITED STATES PATENT AND TRADEMARK OFFICE
CERTIFICATE OF CORRECTION

PATENT NO. : 4,467,454

DATED : AUGUST 21, 1984

INVENTOR(S) : HIROHIKO KUROSU ET AL.

It is certified that error appears in the above-identified patent and that said Letters Patent is hereby corrected as shown below:

```
FRONT PAGE, [75], Inventors
              line 2, "Nagata; Kodaira" should be
              --Nagato, Tokyo--.

Col. 1, line 45, "system." should be --system;
        line 46, delete "system".

Col. 2, line 6, delete ","; after "access" insert --,--;
        line 8, delete "for"; after "information" insert
                --for--;
        line 24, after "quantities" insert --of--.

Col. 4, line 59, "first" should be --burst--.

Col. 5, line 51, delete "the" (second occurrence).
```

Signed and Sealed this

Twenty-third Day of April 1985

[SEAL]

Attest:

DONALD J. QUIGG

Attesting Officer

Acting Commissioner of Patents and Trademarks